(12) United States Patent
Vogt et al.

(10) Patent No.: US 12,544,956 B2
(45) Date of Patent: Feb. 10, 2026

(54) CASTING MOLD FOR FINGER JOINT SPACERS

(71) Applicant: Heraeus Medical GmbH, Wehrheim (DE)

(72) Inventors: Sebastian Vogt, Wehrheim (DE); Thomas Kluge, Wehrheim (DE); Roman Nassut, Wehrheim (DE)

(73) Assignee: Heraeus Medical GmbH, Wehrheim (DE)

(*) Notice: Subject to any disclaimer, the term of this patent is extended or adjusted under 35 U.S.C. 154(b) by 282 days.

(21) Appl. No.: 18/469,254

(22) Filed: Sep. 18, 2023

(65) Prior Publication Data

US 2024/0100748 A1    Mar. 28, 2024

(30) Foreign Application Priority Data

Sep. 23, 2022   (EP) .................................... 22197287

(51) Int. Cl.
| | |
|---|---|
| *B29C 33/26* | (2006.01) |
| *A61F 2/30* | (2006.01) |
| *A61F 2/42* | (2006.01) |
| *B29C 33/00* | (2006.01) |
| *B29C 33/10* | (2006.01) |
| *B29C 33/40* | (2006.01) |
| *B29C 33/42* | (2006.01) |
| *B29L 31/00* | (2006.01) |

(52) U.S. Cl.
CPC ............... *B29C 33/26* (2013.01); *A61F 2/30* (2013.01); *A61F 2/3094* (2013.01); *A61F 2/30942* (2013.01); *A61F 2/4241* (2013.01); *B29C 33/0022* (2013.01); *B29C 33/0055* (2013.01); *B29C 33/10* (2013.01); *B29C 33/405* (2013.01); *B29C 33/42* (2013.01); *A61F 2002/30957* (2013.01); *B29L 2031/7532* (2013.01)

(58) Field of Classification Search
CPC .......................... B29C 33/0055; B29C 33/26
See application file for complete search history.

(56) References Cited

U.S. PATENT DOCUMENTS

| | | | | |
|---|---|---|---|---|
| 2,980,248 | A | * | 4/1961 | Paul .......................... A61J 3/08 |
| | | | | 249/161 |
| 5,413,472 | A | * | 5/1995 | Dietterich ............. B29C 33/303 |
| | | | | 425/188 |

(Continued)

FOREIGN PATENT DOCUMENTS

| | | | | |
|---|---|---|---|---|
| CN | 108081512 A | * | 5/2018 | ......... B29C 33/0055 |
| EP | 2526900 A1 | * | 11/2012 | ........... A61F 2/3094 |

(Continued)

*Primary Examiner* — Atul P. Khare
(74) *Attorney, Agent, or Firm* — Dicke, Billig & Czaja, PLLC (57) ABSTRACT

The invention relates to a device for producing spacers, which comprises a lower part and an upper part, wherein the lower part can be connected to the upper part, and wherein the lower part comprises a first mold cavity, and the upper part comprises a second mold cavity, wherein the first mold cavity is configured to jointly form a hollow space together with the second mold cavity, wherein the first mold cavity comprises a spacer body mold for forming a spacer body, and the second mold cavity comprises a shaft mold for forming a shaft.

14 Claims, 6 Drawing Sheets

(56) References Cited

U.S. PATENT DOCUMENTS

| | | | | |
|---|---|---|---|---|
| 5,711,892 A * | 1/1998 | Ramirez | ................... | B44C 5/06 |
| | | | | 249/105 |
| 5,842,574 A * | 12/1998 | Nunes | ..................... | B28B 7/348 |
| | | | | 220/4.23 |
| 2010/0133725 A1 * | 6/2010 | McCaskey | .............. | B29C 33/26 |
| | | | | 264/299 |
| 2012/0065738 A1 | 3/2012 | Schulman | | |
| 2013/0183398 A1 | 7/2013 | Haney et al. | | |
| 2018/0339440 A1 | 11/2018 | Smith et al. | | |
| 2019/0134857 A1 | 5/2019 | Cappelletti | | |
| 2021/0244618 A1 * | 8/2021 | Bellman | ................ | B29C 33/44 |

FOREIGN PATENT DOCUMENTS

| | | | | |
|---|---|---|---|---|
| EP | 2532323 A1 | 12/2012 | | |
| FR | 2494110 A1 * | 5/1982 | ................ | A61J 3/08 |
| GB | 2181386 A * | 4/1987 | ......... | B29C 45/0441 |

* cited by examiner

CASTING MOLD FOR FINGER JOINT SPACERS

CROSS-REFERENCE TO RELATED APPLICATIONS

This application claims priority pursuant to 35 U.S.C. 119(a) to European Application No. 22197287.0, filed Sep. 23, 2022, which application is incorporated herein by reference in its entirety.

FIELD OF THE INVENTION

The present invention relates to the field of medical technology, in particular devices for producing medical implants, and the medical implants themselves which can be produced therewith. Furthermore, the invention relates to a production method in which the devices according to the invention for producing medical implants are used.

TECHNICAL BACKGROUND

Spacers made of cured polymethyl methacrylate bone cement used as temporary placeholders in septic revisions have long been known. Usually, knee joint, hip joint, shoulder and elbow joint spacers are common. In clinical practice, both industrially prefabricated spacers and spacers fabricated intraoperatively by the surgical staff are used. For the larger joints, a wide variety of commercially available molds are known for intraoperative production. These are generally intended for single use.

However, such spacer molds have not been known in connection with finger joints.

DETAILED DESCRIPTION OF THE INVENTION

Finger joints, including the thumb joints, may be damaged in particular by accidents and also by inflammatory diseases, so that they have to be replaced by artificial joints. The artificial finger joints may be infected by microorganisms, in particular bacteria. The infected artificial finger joints must then be surgically removed and, after debridement, a finger joint spacer, which can be loaded with an antibiotic or with a plurality of antibiotics in addition to a systemic antibiotic treatment, can help calm down the infection in the adjacent soft and bone tissue. Artificial finger joints may then be implanted after the infection has calmed down and the finger joint spacers have been removed. A finger joint spacer can therefore be used in connection with the treatment of a joint infection as a temporary placeholder for a medical implant to be subsequently used.

Moreover, joint injuries which occur with loss of joint function can lead to infections of the adjacent bone and soft tissue. In this case, it is necessary to calm the infection so that artificial finger joints may subsequently be implanted. Spacers which preferably contain one or more antibiotic active ingredients may help calm the infection after corresponding surgical debridement. It would be desirable to develop molds for finger joint spacers with which the surgical personnel can very easily produce finger joint spacers intraoperatively using polymethyl methacrylate bone cement paste. After the infection is calmed and the finger joint spacers are removed, joint function can then be restored by implanting artificial finger joints.

It is therefore an object of the invention to develop a mold that can be produced as inexpensively as possible, for example made of plastics material, for producing spacers with the aid of polymethyl methacrylate bone cement. It is desirable to fill the mold in a simple manner with highly viscous polymethyl methacrylate bone cement without pressure. The mold can preferably also enable the simple and reproducible production of finger joint spacers of different sizes.

Preferred Embodiments

One aspect of the invention relates in a first embodiment to a device for producing spacers, preferably finger joint spacers, comprising a lower part which can be connected to an upper part,
wherein the lower part comprises a first mold cavity, and the upper part comprises a second mold cavity, wherein the first mold cavity is configured to jointly form a hollow space together with the second mold cavity, wherein the first mold cavity comprises a spacer body mold for forming a spacer body, and the second mold cavity comprises a shaft mold for forming a shaft.

A second embodiment relates to a device according to the first aforementioned embodiment, wherein the hollow space comprises a volume of 0.1 to 5 cm$^3$, preferably 0.3 to 4.0 cm$^3$.

A third embodiment relates to a device according to the first or second aforementioned embodiment, wherein the shaft mold comprises the shape of a rotational body, a pyramid or a truncated pyramid.

A fourth embodiment relates to a device according to one of the preceding embodiments, wherein the spacer body mold is substantially cuboid or substantially hemispherical.

A fifth embodiment relates to a device according to one of the preceding embodiments, wherein the spacer body mold comprises an end face which is designed to form an articulating surface which is suitable for forming a joint together with another articulating surface of a corresponding spacer body.

A sixth embodiment relates to a device according to embodiment five, wherein the end face has a curved shape which is preferably convex or concave.

A seventh embodiment relates to a device according to one of the preceding embodiments, also comprising a flexible connecting element which connects the lower part to the upper part, wherein the connecting element is preferably arranged at the edge of the lower part and the upper part.

An eighth embodiment relates to a device according to one of the preceding embodiments, also comprising a first fastening element and a second fastening element complementary thereto, wherein the device is configured to connect the lower part to the upper part by engaging the first fastening element in the second fastening element.

A ninth embodiment relates to a device according to one of the preceding embodiments, also comprising a groove arranged circumferentially along at least one of the mold cavities.

A tenth embodiment relates to a device according to embodiment nine, also comprising a bar which is arranged and configured to engage in the groove in a form-fitting manner in order to outwardly seal the hollow space by connecting the lower part to the upper part.

An eleventh embodiment relates to a device according to embodiment ten, wherein the groove and the bar are arranged and configured to form an empty space between the bar and the groove by engaging the bar into the groove, said empty space being designed to receive excess bone cement.

A twelfth embodiment relates to a device according to one of the preceding embodiments, wherein the lower part and/or the upper part has an opening which is configured for venting the hollow space.

A thirteenth embodiment relates to a device according to one of the preceding embodiments, wherein the lower part and/or the upper part comprise a polymer selected from the group consisting of rubber, silicone rubber, synthetic rubber, ethylene propylene diene rubber, polyethylene, polyether ether ketone, and polypropylene, preferably polypropylene, wherein the polymer is more preferably transparent or translucent.

Another aspect relates to a spacer, preferably a finger joint spacer, which can be produced by means of a device according to one of the preceding embodiments, comprising a spacer body and a shaft for anchoring in a bone tissue, wherein the spacer body comprises an articulating surface which is suitable for forming a joint together with another articulating surface of a corresponding spacer body.

Another aspect relates to a method for producing a spacer, preferably a finger joint spacer, comprising the following steps:
(i) providing a device according to one of the first to thirteenth embodiments,
(ii) bringing the first mold cavity into contact with the second mold cavity so as to form an outwardly sealed cavity,
(ii.a) optionally connecting the lower part to the upper part by means of a first fastening element and a second fastening element complementary thereto,
(ii.b.) optionally, alternatively or additionally to step (ii.a.), connecting the lower part to the upper part by engaging a bar into a groove,
(iii) introducing a bone cement paste into the first mold cavity and the second mold cavity,
(iv) curing the bone cement paste,
(v) opening the hollow space by at least partially releasing the lower part from the upper part, and
(vi) thereby obtaining a spacer made from bone cement, wherein step (iii) takes place before or after steps (ii), (ii.a.) and (ii.b).

DETAILED DESCRIPTION

In principle, for the embodiments described herein, the elements of which "contain" or "comprise" a particular feature (e.g., a material), a further embodiment is always considered in which the element in question consists of that feature alone, i.e., comprises no further components. The word "comprise" or "comprising" is used herein synonymously with the word "contain" or "containing."

If an element is referred to in the singular in an embodiment, an embodiment is also considered in which a plurality of these elements are present. The use of a term for an element in the plural fundamentally also encompasses an embodiment in which only a single corresponding element is contained.

Unless otherwise indicated or clearly precluded from the context, it is possible in principle, and is herewith clearly taken into consideration, that features of different embodiments may also be present in the other embodiments described herein. It is also contemplated in principle that all features that are described herein in conjunction with a method are also applicable to the products and devices described herein, and vice versa. Only for reasons of succinct presentation are all such contemplated combinations not explicitly listed in all instances. Technical solutions which are known to be equivalent to the features described herein are also intended to be encompassed in principle by the scope of the invention.

A first aspect of the invention relates to a device for producing spacers. Preferably, the spacers are provided for use in the region of a hand, in particular a finger. They are preferably finger joint spacers. The device comprises a lower part and an upper part. The lower part can be connected to the upper part. The lower part can be permanently connected to the upper part at at least one location. The lower part comprises at least one first mold cavity. The upper part comprises at least one second mold cavity. The first mold cavity and the second mold cavity are each defined by an edge that delimits the mold cavity to the outside. Preferably, the first mold cavity and the second mold cavity may be connected to one another at their respective outer edges. The first mold cavity is configured to form a hollow space together with the second mold cavity. This cavity is preferably formed by the above-described joining together of the first mold cavity with the second mold cavity. This cavity serves to receive a bone cement paste from which a spacer, in particular a finger joint spacer, can be formed. The shape of the spacer is defined by the shape of the hollow space. The first mold cavity comprises a spacer body mold for forming a spacer body, and the second mold cavity comprises a shaft mold for forming a shaft. The shaft mold and the spacer body mold are preferably configured to form a continuous unit with one another when the lower part and the upper part are brought into contact with one another in a suitable manner. Accordingly, a spacer made of bone cement, which comprises a spacer body and a shaft which form a continuous unit with one another, can preferably be formed from the device according to the invention. The spacer is preferably a finger joint spacer. The spacer can be an articulating spacer or a non-articulating spacer. An articulating spacer is configured to jointly form a joint together with another spacer.

In one embodiment, the first mold cavity, like the second mold cavity, can comprise a shaft mold, so that the device can be suitable for producing a spacer with two shafts. Such a spacer can be, for example, a non-articulating spacer. In one embodiment, a non-articulating spacer is configured to rigidly connect two different bones to one another.

A "bone cement paste" refers herein to a malleable mass that can be hardened to form a bone cement. Commercially available bone cements are offered in many cases as a kit, which contains a liquid and a solid component. By mixing the liquid with the solid component, the user can produce a bone cement paste which is easily deformable for a limited time. Even a short time after mixing, the bone cement paste is tack-free, i.e. it no longer adheres to a glove upon slight contact therewith (as defined in ISO 5833:2002). In this state, a bone cement paste can preferably be filled into a mold cavity of the device according to the invention for producing spacers, for example with the aid of a stirrer spatula or a suitable dispensing device. Commercially available bone cements are frequently offered based on polymethyl methacrylate (PMMA). The device according to the invention can preferably be used with such a PMMA bone cement. However, it is also possible in principle to use other types of bone cements.

The term "mold cavity" as used herein includes the "first mold cavity" and "second mold cavity" described herein.

The first mold cavity comprises a spacer body mold for forming a spacer body made of bone cement. The second mold cavity comprises a shaft mold for forming a shaft from bone cement. The first mold cavity and the second mold cavity are configured to form a hollow space with one another. The size of the hollow space is preferably dimensioned such that suitable spacer bodies made of bone cement may be produced with the device according to the invention, which can be implanted in the region of a human finger joint. The volume of the hollow space corresponds to the sum of the volumes of the first mold cavity and the second mold cavity, which together form the hollow space. For example, the hollow space for receiving bone cement paste can comprise a volume of 0.1 to 5 cm$^3$, preferably 0.3 to 4.0 cm$^3$. Depending on the physiological conditions of a patient to be treated, larger or smaller volumes may be suitable.

A shaft is part of a spacer which is preferably configured for insertion into a bone tissue. The shaft mold can preferably comprise the shape of a rotational body. A rotational body is a geometric body, the surface of which is formed by rotation of a generating curve about an axis of rotation. Examples of rotation bodies include a cone or a truncated cone. In one embodiment, the shaft mold has the shape of a truncated cone. The shaft mold can also comprise the shape of a pyramid or a truncated pyramid. A pyramid has a polygonal base area (i.e., a polygon as the base area), and a plurality of triangular side surfaces, which touch one another at a common point. A truncated pyramid can be formed geometrically by a smaller, similar pyramid (supplementary pyramid) being cut off from a pyramid (starting pyramid) parallel to the base surface at the lateral surfaces.

The spacer body mold can preferably be substantially cuboid or substantially hemispherical. A "substantially cuboid" spacer body mold can also comprise a curved surface which deviates slightly from a geometrically exact cuboid basic shape, as described below.

The spacer body mold serves to form a spacer body, which can preferably comprise an articulating surface. An "articulating surface" is preferably configured to form a joint with a corresponding additional articulating surface, similar to a human finger joint. For example, a rectangular concave articulating surface can engage in a rectangular convex articulation surface in order to form a hinge-like joint. In a comparable manner, a hemispherical articulating surface can engage in a corresponding surface with a hemispherical recess, similar to a ball joint. Such a suitable interaction of two spacers according to the invention preferably allows a patient implanted with such spacers to continue to move his fingers in a similar manner as with a natural joint. Examples of the above-described interaction of two mutually coordinated articulated surfaces in the manner of a hinge joint or ball joint are shown in the attached drawings.

Accordingly, the device according to the invention preferably comprises a spacer body mold with an end face which is designed to form an articulating surface which is suitable for forming a joint together with another articulating surface of a corresponding spacer body.

In some embodiments, it is therefore preferred that the end face of the spacer body mold has a curved shape, for example a convex or concave shape. This allows, for example, spacers to be molded whose spacer bodies have an articulating surface with a concave shape and may form a joint together with another spacer body with a corresponding articulating surface with a convex shape.

In another embodiment, the device comprises a flexible connecting element which connects the lower part to the upper part. The connecting element is preferably arranged at the edge of the lower part and the upper part. For example, the lower part can be connected to the upper part by means of a film hinge. However, embodiments are also possible in which the lower part and the upper part are each present as separate elements of a device, and are not permanently connected to one another via a connecting element.

In another embodiment, the device comprises a first fastening element and a second fastening element complementary thereto. By engaging the first fastening element into the second fastening element, the upper part can be connected to the lower part. For this purpose, the upper part can comprise a first fastening element, and the lower part can comprise a matching second fastening element, or vice versa. For example, the upper part can contain a pin, which can latch into a socket or recess in the lower part in order to securely clamp the upper part with the lower part. As a result, the first mold cavity and the second mold cavity may be connected to one another in a suitable position and held in this position in a stable manner in order to form the hollow space for forming a spacer. Similarly, a clamp or clip, possibly with a suitable counterpart, can be provided as a fastening element.

In a preferred embodiment, the device according to the invention comprises both a connecting element and a first fastening element and a second fastening element complementary thereto. As a result, the lower part and upper part may be connected to one another in a particularly stable manner and fixed relative to one another in a desired orientation.

In another embodiment, the device comprises a groove arranged circumferentially along at least one of the mold cavities. Preferably, the groove is arranged in spatial proximity to an edge of a mold cavity. The edge of a mold cavity designates an edge at which the geometry of a mold cavity described herein, which is configured to form a hollow space with a second mold cavity, is delimited to the outside.

The device can also comprise a bar which is arranged in a similar manner circumferentially along one of the mold cavities, so that it can engage in a corresponding opposite groove of another mold cavity. As a result, the lower part can be fixedly connected to the upper part in order to seal to the outside the hollow space formed jointly by the two mold cavities.

In a preferred embodiment, the groove can be deeper than the height of a matching bar, so that an empty space between the bar and the groove can be formed by engaging the bar into the groove. This empty space can preferably be configured for receiving excess bone cement. As a result, the formation of burrs during the molding of spacers can be counteracted, since the excess bone cement received by the empty space does not remain directly on the surface of the shaped spacer.

In another embodiment, the lower part and/or the upper part may comprise an opening for venting the hollow space. Preferably, both the lower part and the upper part each comprise at least one such opening. It can be particularly advantageous to provide such openings both in the tip of the shaft mold and in several corners of the spacer body mold. With the aid of such an opening, it can be ensured that the mold cavities and the hollow space may be filled completely with bone cement paste. The air displaced by the bone cement paste can escape from the mold cavity through an opening.

The device according to the invention can in principle consist of any suitable material. Flexible elastic materials may facilitate removal of the molded spacers. The device can comprise a metal or polymer. Examples of suitable polymers include rubber, silicone rubber, synthetic rubber, ethylene propylene diene rubber (EPDM), polyethylene, polyether ether ketone, and polypropylene. Devices made of polypropylene allow particularly easy removal of the cured bone cement from the device. In some embodiments, the device is formed from a transparent or at least translucent, i.e. visually translucent, material. Corresponding transparent or translucent polymers are available for this purpose. As a result, the user of the device can check whether the mold cavities are completely filled with bone cement paste.

Another aspect of the invention relates to a carrier on which several of the above-described devices for producing a spacer are arranged on a planar surface. Each of the devices can be surrounded by recesses which enable the device to be removed from the carrier by severing the intermediate regions arranged between the recesses. The carrier can comprise different devices, which differ, for example, in terms of the shape and/or the volume of the first and/or second mold cavities. For example, this can enable the user to select the most suitable device for different patients or joints to be treated. In the form of such a carrier, devices according to the invention may therefore be provided which may be used for a large number of different patients and uses. The different devices on a carrier may also differ, for example, by the presence or the formation of the connecting elements, bars, grooves and/or fastening elements described herein.

Another aspect of the invention relates to a spacer. Preferably, the spacer is provided for use in the region of a hand, in particular a finger. It is preferably a finger joint spacer. Such a finger joint spacer can preferably be produced by means of a device described herein. The spacer can comprise a spacer body and a shaft. The shaft can be configured for anchoring in a bone tissue. The spacer body can comprise an articulating surface. The articulating surface can be suitable for forming a joint together with the aid of another articulating surface of a corresponding spacer body, as already explained in detail herein in connection with the described device.

In one embodiment, the invention relates to two spacers, the spacer bodies of which each have an articulating surface which are configured to form a joint with one another.

In one embodiment, the spacer comprises or consists of bone cement. The bone cement preferably comprises PMMA. The bone cement can comprise an antibiotic. Examples of suitable antibiotics include gentamicin, clindamycin and vancomycin. The spacer is preferably configured to temporarily replace a natural joint, such as a finger joint, of a patient in connection with a surgical procedure. "Finger joint" refers herein to all joints within the fingers, including the thumb. In one embodiment, the spacer can be used in the region of the hand, for example in the region of the metacarpal bones.

The spacer, preferably finger joint spacer, can be an articulating or non-articulating spacer, as described herein in connection with the devices according to the invention. Optionally, the articulating spacers described herein may be connected to one another in pairs, for example by means of bone cement, in order to form a non-articulating spacer.

Another aspect of the invention relates to a method for producing a spacer, preferably a finger joint spacer, comprising the steps of:
(i) providing a device described herein for producing a spacer,
(ii) bringing the first mold cavity into contact with the second mold cavity so as to form an outwardly sealed hollow space,
(ii.a) optionally connecting the lower part to the upper part by means of a first fastening element and a second fastening element complementary thereto,
(ii.b.) optionally, alternatively or additionally to step (ii.a.), connecting the lower part to the upper part by engaging a bar into a groove,
(iii) introducing a bone cement paste into the first mold cavity and the second mold cavity,
(iv) curing the bone cement paste,
(v) opening the hollow space by at least partially releasing the lower part from the upper part, and
(vi) thereby obtaining a spacer, preferably a finger joint spacer, made from bone cement.

In a first step (i) of the method, a device according to the invention for producing a spacer, preferably a finger joint spacer, is provided. For example, a device can be used which comprises a lower part and an upper part, wherein the lower part can be connected to the upper part, and wherein the lower part comprises a first mold cavity, and the upper part comprises a second mold cavity, wherein the first mold cavity is configured to jointly form a hollow space together with the second mold cavity, wherein the first mold cavity comprises a spacer body mold for forming a spacer body, and the second mold cavity comprises a shaft mold for forming a shaft.

In a second step (ii) of the method, the lower part of the device is brought into contact with the upper part of the device, so that an outwardly sealed cavity forms, as described in more detail herein in the context of the device.

In an optional further step (ii.a) of the method, the upper part can be connected to the lower part by means of a first fastening element and a second fastening element complementary thereto. For example, the upper part can comprise a pin which can engage in a matching recess in the lower part.

In an optional further step (ii.b) of the method, the lower part can be connected to the upper part by a bar of the upper part engaging in a groove of the lower part. Alternatively or additionally, a bar of the lower part can engage in a groove of the upper part.

In a third step (iii) of the method, bone cement paste is introduced into a first and a second mold cavity of the device. In this case, the mold cavities should preferably be filled without air bubbles and completely with the bone cement paste. The bone cement paste can either precede step (ii), i.e., bringing the first mold cavity into contact with the second mold cavity, or follow it. According to one embodiment, the bone cement paste can be placed directly into the mold cavities which are present separately from one another, for example by spreading the bone cement paste with the aid of a spatula, or by means of a suitable dispensing device. If the mold cavities are already joined together, the bone cement paste can be injected through an opening in one of the mold cavities into the hollow space, which is formed together by the first and the second mold cavities.

In a fourth step (iv) of the method, the bone cement paste is cured. The bone cement paste typically contains reactive components which, after the bone cement paste has been mixed, can bond to one another within a few minutes by chemical reaction, so that a hard, no longer deformable material is formed. This material is referred to as (cured) bone cement and forms the finger joint spacer according to the invention.

In a fifth step (v), the hollow space in which the cured bone cement is located is opened. For this purpose, the upper part is again separated from the lower part, wherein the upper part can optionally be connected to the lower part via a connecting element, but the mold cavities no longer lie against each other.

In a sixth step (vi), a spacer, preferably a finger joint spacer, is obtained from bone cement. This can now be removed from the device.

The steps of the method depicted above may in principle occur in any sequence. In one embodiment, the method is carried out in the sequence shown above. In another embodiment, a bone cement paste is introduced, for example, before the first mold cavity is contacted with the second mold cavity.

EXAMPLES

The invention is further illustrated below using examples, which are, however, not to be understood as limiting. It will be apparent to a person skilled in the art that other equivalent means may be similarly used in place of the features described here.

FIGURES

Figure 1:
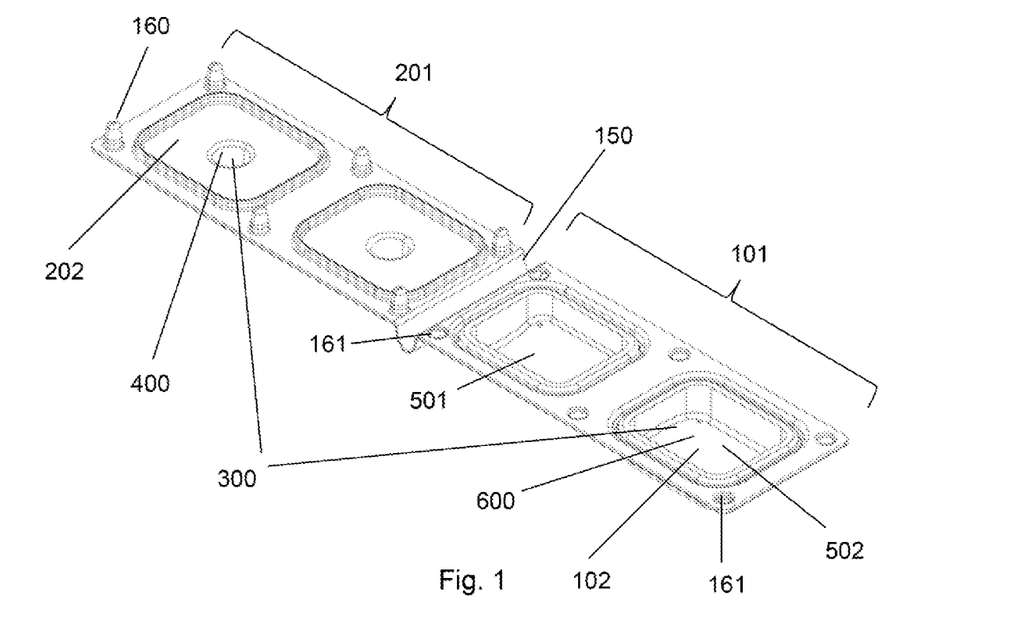

FIG. 1 shows by way of example a first embodiment of the invention. The device according to the invention comprises a lower part 101, which comprises at least one first mold cavity 102. In the example shown in FIG. 1, the lower part 101 comprises two first mold cavities 102. The first mold cavities 102 each comprise a spacer body mold 600 with an end face 501, 502. In the example shown here, one of the two first mold cavities comprises 102 an outwardly curved, i.e. convex, end face 501, and the other of the two first mold cavities 102 comprises an inwardly curved, i.e. concave, end face 502. The spacer bodies which can be produced with the aid of these spacer body molds are thereby given mutually matching articulating surfaces, which may form a joint with one another. The lower part also comprises circular recesses as the first fastening element 160.

The device also comprises an upper part 201 with at least one second mold cavity 202. In the example shown here, the upper part 201 contains two second mold cavities 202. The second mold cavity 202 includes a shaft mold 400 by means of which the shaft of a spacer can be produced. One part of the shaft mold 400 is therefore in the form of a truncated cone in this example. The shafts which can be produced therefrom may therefore be designed to engage in a bone tissue. The upper part also comprises pin-shaped projections as the second fastening element 161, which may engage into the recesses of the lower part 160 in order to align the mold cavities of the lower part flush with the mold cavities of the upper part and hold them in this aligned position. In this case, a hollow space 300 is formed by a first mold cavity 102 and a second mold cavity 202 in pairs. This hollow space 300 is configured to be filled with bone cement paste in order to form a spacer from the bone cement paste.

Furthermore, the lower part is 101 is connected to the upper part 201 with the aid of a connecting element 150, which is a film hinge in the example shown here.

Figure 2:
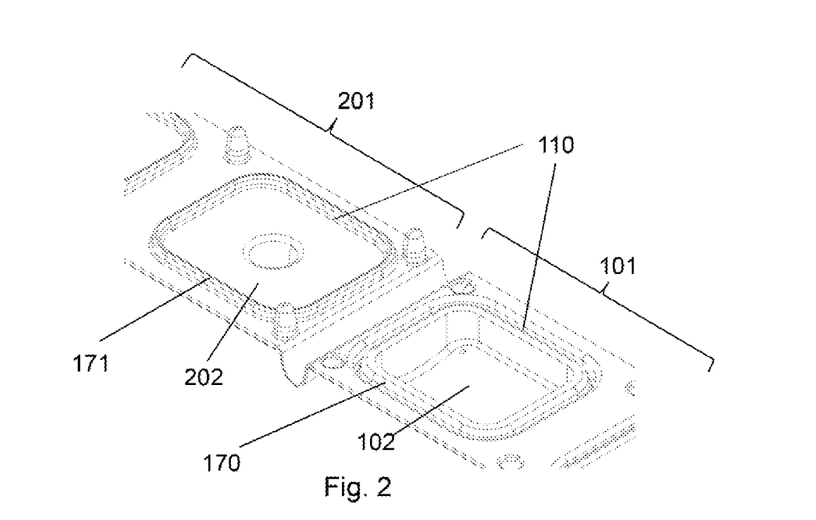

FIG. 2 shows an enlarged view of the embodiment shown in FIG. 1. The lower part 101 comprises a groove 170 that is arranged along the edge 110 of a first mold cavity 102. The upper part 201 comprises a bar 171 that is arranged along the edge 110 of a second mold cavity 202.

The edge 110 designates in each case the peripheral edge of a mold cavity until the relevant mold cavity is to be filled at least with bone cement paste, so that the hollow space 300, after the lower part has been joined to the upper part, is completely filled with bone cement paste.

Figure 3:
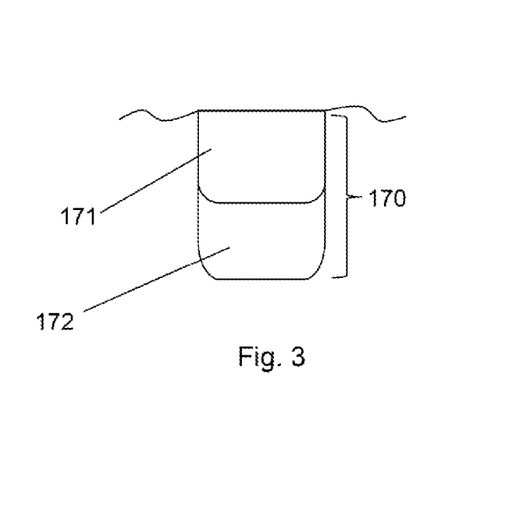

FIG. 3 schematically shows a detail of an embodiment according to FIG. 2, wherein the lower part is connected to the upper part as described above, so that a first mold cavity forms a hollow space in a pair with a second mold cavity. In so doing, a bar 171 which is arranged along a second mold cavity engages in a groove 170 of a first mold cavity, wherein the bar 171 seals the groove 170 to the outside and, at the same time, a closed empty space 172 is formed between the bar 171 and groove 170. The empty space 172 can accommodate excess bone cement paste which, when the lower part is joined together with the upper part, is pushed outwards out of the mold cavities. As a result, the formation of burrs on the molded finger joint spacers can be reduced or decreased.

Figure 4:
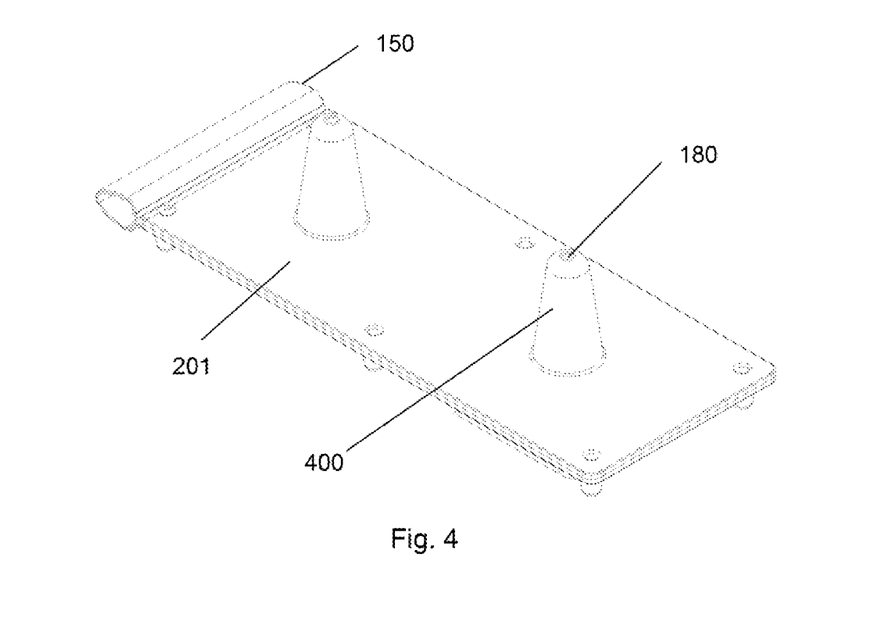

FIG. 4 shows an embodiment of the device according to the invention, with which the lower part 101 is brought into contact with the upper part 201 to form an outwardly sealed cavity. The lower part 101 is connected to the upper part 201 via a flexible connecting element 150. In the embodiment shown here, the shaft mold 400 of a second mold cavity 202 has an opening 180, which is arranged in the tip of the frustoconical shaft mold 400. This opening 180 can serve to let air escape from the shaft mold 400 of the second mold cavity 202 when the second mold cavity 202 is filled with bone cement paste. This allows a complete filling of the device, in particular of the second mold cavity 202 and the hollow space 300, without air bubbles (not visible in this figure). If necessary, the opening can 180 also be used for adding bone cement paste.

Figure 5:
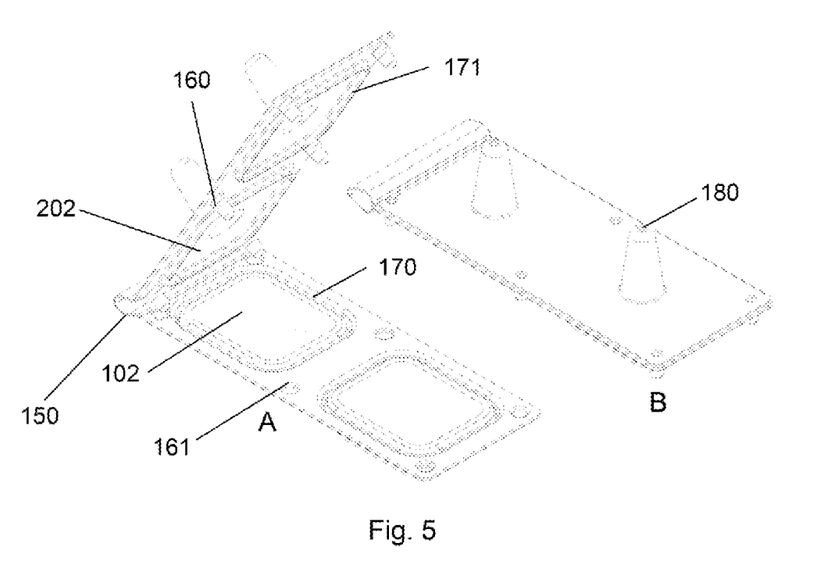

FIG. 5A shows an embodiment of the device according to the invention, with which the upper part 201 is moved towards the lower part 101 while bending the connecting element 150 in order to bring the first mold cavity 102 into contact with the second mold cavity 202. In this state, the first mold cavity 102 and the second mold cavity 202 may already be filled with bone cement paste.

FIG. 5B shows the same device in a closed or "folded" state, with which the first mold cavity 102 is brought into contact with the second mold cavity 202, wherein the two mold cavities together form a hollow space which is sealed to the outside. The cavity is only accessible to the outside via an optional opening 180. A plurality of such openings may also be provided. The first fastening element 160 engages in the second fastening element 161 in order to firmly connect the two fastening elements to one another and to hold the first mold cavity 102 against the second mold cavity 202 in a fixed position, so that a spacer can be produced in the device.

Figure 6:
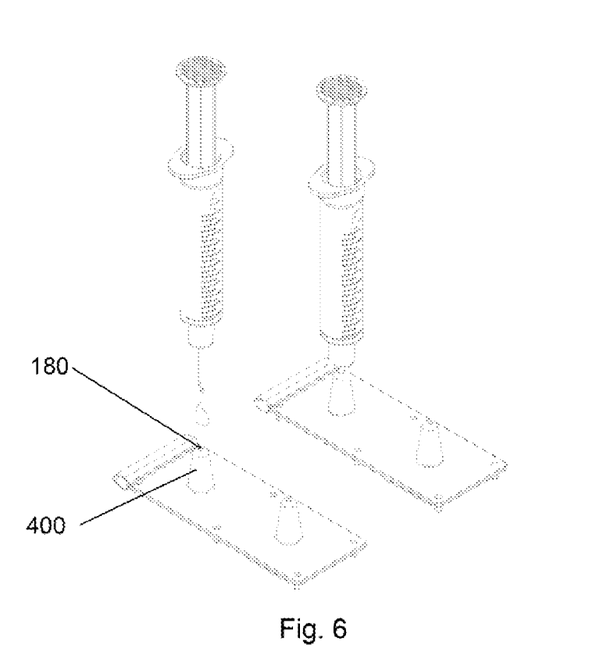

FIG. 6 shows a possibility of filling the device according to the invention with bone cement paste when in a closed state according to FIG. 5B. To accomplish this, bone cement paste is introduced into a mold cavity via an opening 180. In the example shown here, the opening 180 is located at the tip of a shaft mold 400. This type of filling is particularly advantageous when using low-viscosity bone cement paste.

Figure 7:
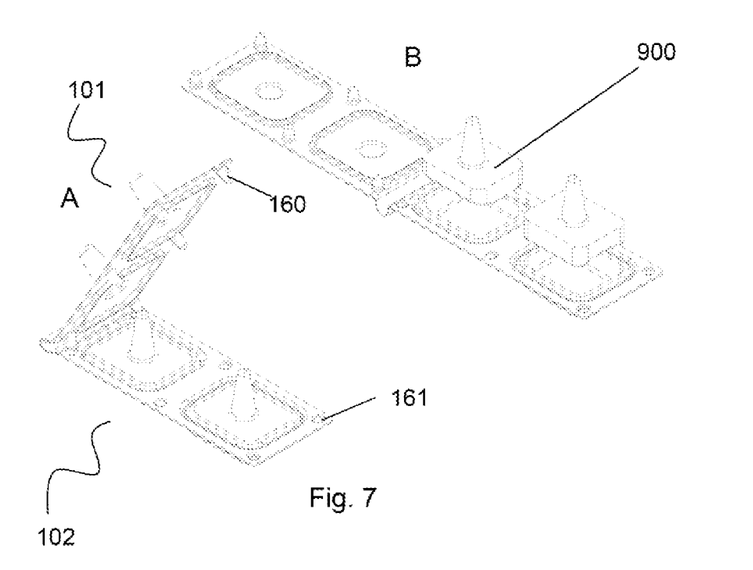

FIG. 7A shows a device according to the invention, which has been reopened after the previously inserted bone cement paste has cured. For this purpose, the first fastening element 160 is separated from the second fastening element 161, the groove 170 is moved out of the bar 171, and the upper part 201 is separated from the lower part 101 by a rotational movement, wherein the lower part 101 is still connected via a connecting element 150 to the upper part 201. This opens the device and exposes the molded spacer 900.

FIG. 7B shows the removal of a spacer 900 of bone cement from the device according to the invention after it has been completely opened. In this open configuration shown here, the lower part 101 and upper part 201 lie in a common plane.

Figure 8:
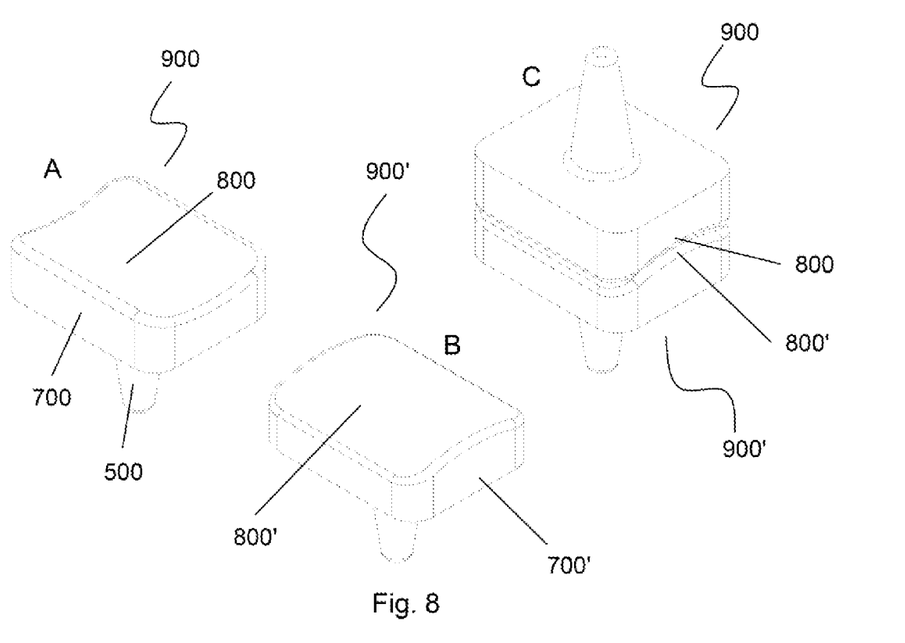

FIG. 8A shows a finger joint spacer 900, which comprises a shaft 500 and a spacer body 700. The spacer body 700 comprises an articulating surface 800, which has a rounded, substantially rectangular geometry, and a curvature in the direction of the inner side of the spacer body 700. The articulating surface 800 is therefore concave.

FIG. 8B shows a finger joint spacer 900', which has a complementary shape to a finger joint spacer 900 shown in FIG. 8A. This means that the finger joint spacer 900' comprises an articulating surface 800', which, by interaction with the articulating surface 800, is configured to form a joint from the two finger joint spacers. For this purpose, the finger joint spacer 900' has a spacer body 700', which comprises a convex, i.e. outwardly curved, articulating surface 800'.

FIG. 8C shows how the finger joint spacer 900 according to FIG. 8A and the finger joint spacer 900' according to FIG. 8B together form a joint in that their two articulating surfaces 800 and 800' are brought into contact with each other.

Figure 9:
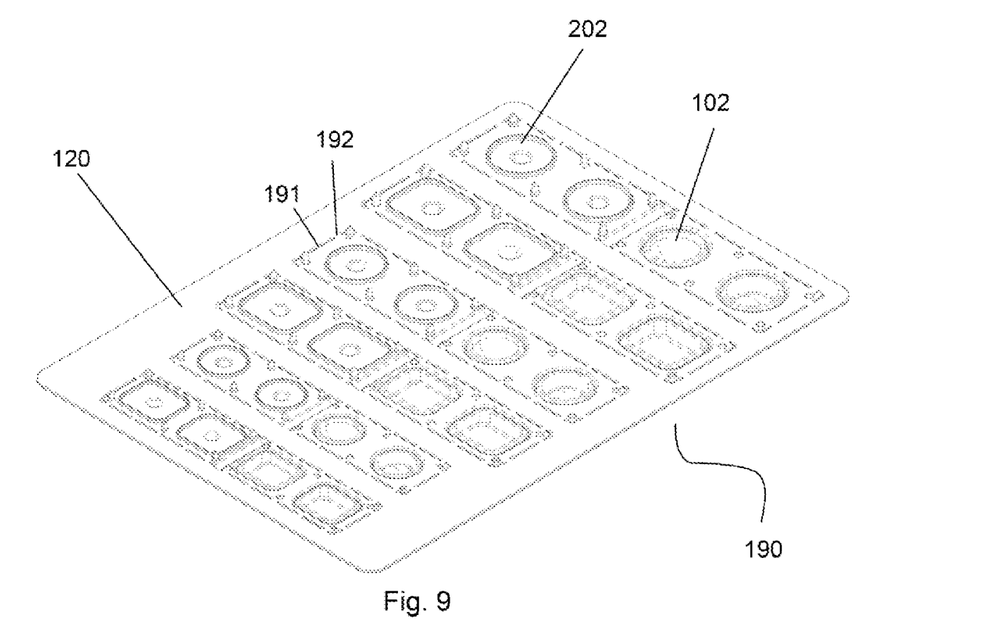

FIG. 9 shows a carrier 190 on which various devices according to the preceding figures are arranged on a planar surface 120. The individual devices are surrounded by a plurality of recesses 191, which allow the devices to be detached by cutting through the intermediate regions 192 located between the recesses, for example with a pair of scissors or other cutting tool. Different devices according to the invention may be arranged on a carrier, for example devices with mold cavities 102, 202 which have different geometries and/or sizes. For example, mold cavities with different volumes and/or mold cavities with a substantially cuboid and hemispherical shape may be arranged on a common carrier 190.

Figure 10:
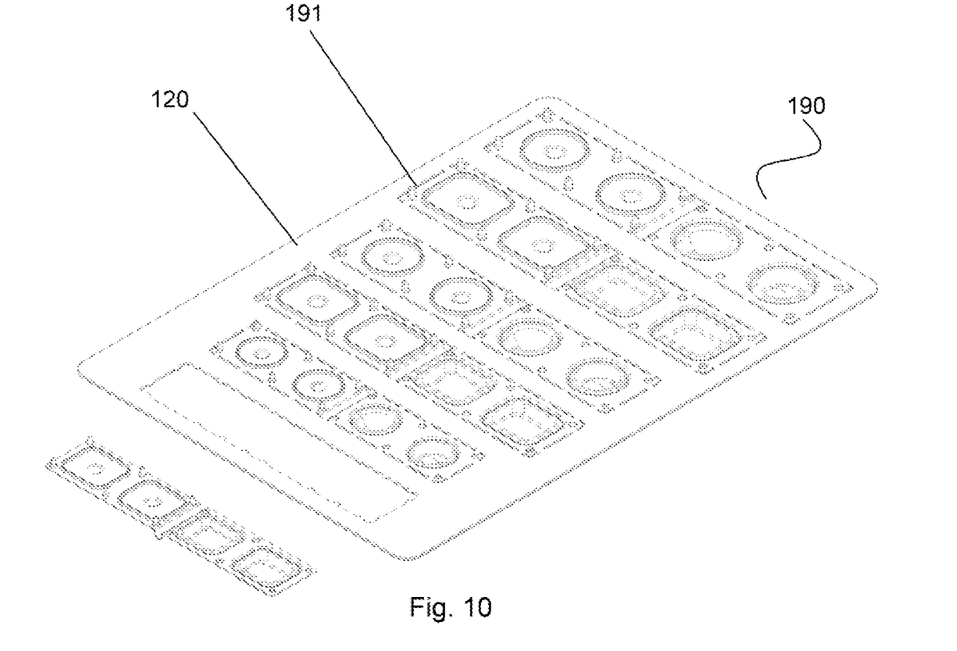

FIG. 10 shows a carrier 190 according to FIG. 9, with which one of the devices according to the invention is detached from the carrier 190 by separating the intermediate regions.

Figure 11:
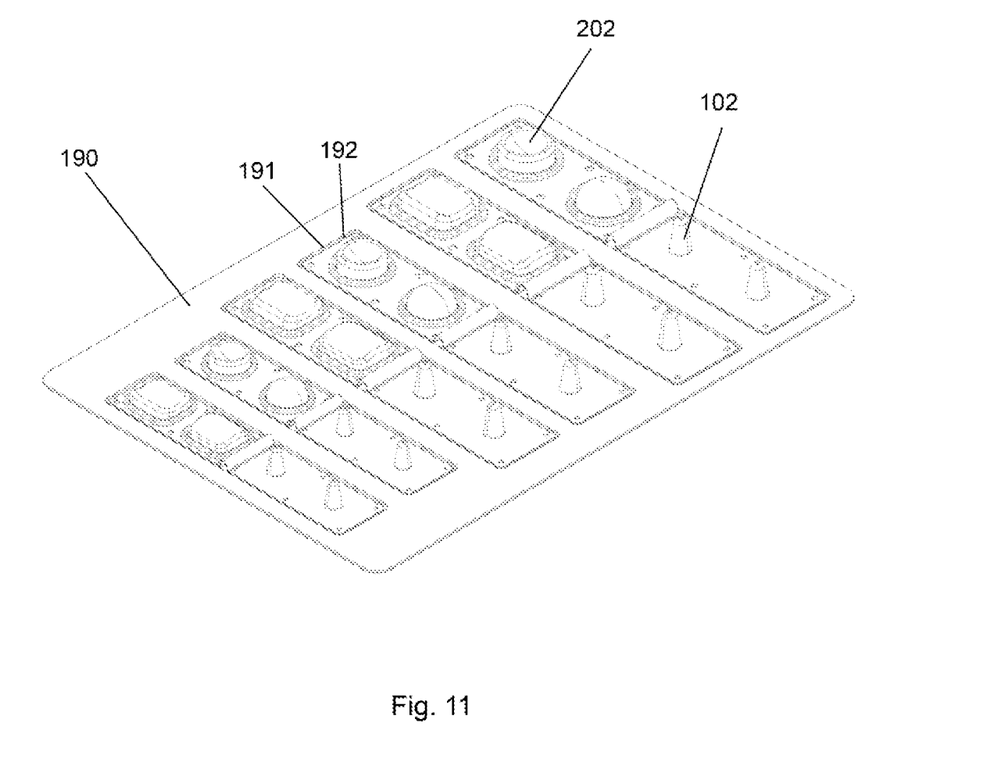

FIG. 11 shows a carrier 190 according to FIG. 9 from another perspective. The geometry of the different shaped mold cavities 102, 202 can be seen particularly well from this view.

LIST OF REFERENCE SIGNS

101 Lower part
102 First mold cavity
110 Edge
120 Planar surface
150 Connecting element
160 First fastening element
161 Second fastening element
170 Groove
171 Bar
172 Empty space
180 Opening
190 Carrier
191 Recess
192 Intermediate region
201 Upper part
202 Second mold cavity
300 Hollow space
400 Shaft mold
500 Shaft
501, 502 End face
600 Spacer body mold
700, 701' Spacer body
800, 800' Articulating surface
900, 900' Finger joint spacer

What is claimed is:

1. A device for producing finger joint spacers, the device comprising a lower part and an upper part, wherein the lower part is connectable to the upper part, wherein the lower part comprises a first mold cavity and the upper part comprises a second mold cavity, wherein the first mold cavity is configured to jointly form a hollow space together with the second mold cavity, wherein the first mold cavity comprises a spacer body mold for forming a body of a first one of the spacers and the second mold cavity comprises a shaft mold for forming a shaft of the first spacer, wherein the device further comprises a groove arranged circumferentially along at least one of the first and second mold cavities, and a bar which is arranged and configured to engage in the groove in a form-fitting matter in order to outwardly seal the hollow space by connecting the lower part to the upper part, wherein the groove and the bar are arranged and configured to form an empty space between the bar and the groove by engaging the bar into the groove, said empty space being designed to receive excess bone cement.

2. The device according to claim 1, wherein the hollow space comprises a volume of 0.1 to 5 cm$^3$.

3. The device according to claim 2, wherein the hollow space comprises a volume of 0.3 to 4.0 cm$^3$.

4. The device according to claim 1, wherein the shaft mold comprises the shape of a rotational body, pyramid, or truncated pyramid.

5. The device according to claim 1, wherein the hollow space comprises a volume of 0.1 to 5 cm$^3$, preferably 0.3 to 4.0 cm$^3$.

6. The device according to claim 1, wherein the spacer body mold comprises an end face which is configured to form an articulating surface which is suitable for jointly forming a joint together with another articulating surface of a body of a second one of the spacers.

7. The device according to claim 6, wherein the end face has a curved shape.

8. The device of claim 7, wherein the curved shape is concave or convex.

9. The device according to claim 1, further comprising a flexible connecting element which connects the lower part to the upper part.

10. The device according to claim 9, wherein the connecting element is arranged at an edge of each of the lower part and the upper part.

11. The device according to claim 1, further comprising a first fastening element and a second fastening element complementary thereto, wherein the device is configured to connect the lower part to the upper part by engaging the first fastening element in the second fastening element.

12. The device according to claim 1, wherein the lower part and/or the upper part has an opening which is configured for venting the hollow space.

13. The device according to claim 1, wherein the lower part and/or the upper part comprise a polymer selected from the group consisting of silicone rubber, synthetic rubber, ethylene propylene diene rubber (EPDM), polyethylene, polyether ether ketone, and polypropylene wherein the polymer is transparent or translucent.

14. A method for producing a finger joint spacer, the method comprising the following steps:
   (i) providing a device according to claim 1,
   (ii) bringing the first mold cavity into contact with the second mold cavity of the device so as to form the outwardly sealed hollow space, (ii.a) optionally connecting the lower part to the upper part by means of a first fastening element and a second fastening element complementary thereto,
(ii.b.) optionally or additionally to step (ii.a.), connecting the lower part to the upper part by engaging the bar into the groove,
(iii) introducing a bone cement paste into the first mold cavity and the second mold cavity,
(iv) curing the bone cement paste,
(v) opening the hollow space by at least partially releasing the lower part from the upper part, and
(vi) thereby obtaining a spacer made from bone cement.

* * * * *